3,453,341
DECAHYDRONAPHTHALENE
Ronald D. Bushick, Glen Mills, Pa., assignor to Sun Oil Company, Philadelphia, Pa., a corporation of New Jersey
No Drawing. Filed Oct. 27, 1967, Ser. No. 678,509
Int. Cl. C07c 5/28, 15/24
U.S. Cl. 260—668    5 Claims

ABSTRACT OF THE DISCLOSURE

A catalyst for use in the isomerization of saturated dicyclic systems which comprises $SbF_5$ and a co-catalyst of HF or $HSO_3F$.

---

This invention relates to a catalyst system, and more particularly, a catalyst system without initiation for the isomerization of saturated dicyclic systems.

Decahydronaphthalene (Decalin) and its alkyl substituted homologues generally have been prepared by the hydrogenation of naphthalenes of corresponding structures. Recently, as described by Schneider in U.S. Patent Nos. 3,219,718 and 3,243,469, it has been discovered that decahydronaphthalenes can be prepared by the isomerization of dicyclic naphthenes having two cyclic rings utilizing an aluminum halide-hydrogen halide catalyst. Preferably, the catalyst is a liquid complex obtained by reacting the aluminum halide and hydrogen halide catalyst in the presence of a paraffin hydrocarbon. Various dicyclic naphthenes having 12–20 carbon atoms, when reacted in the presence of the aforesaid catalyst at a temperature in the range of −20° C. to 70° C. will rearrange to form decahydronaphthalenes having the same empirical formula as the dicyclic naphthene charged.

It has now been discovered that superior yields of the mixed decahydronaphthalenes can be obtained through the use of a catalyst system consisting of $SbF_5$ and a co-catalyst of either HF or $HSO_3F$. Preferably, the catalysts are HF and $SbF_5$. This catalyst system enables one to obtain a final product distribution comparable to the complex catalyst system aforementioned, yet superior to the simple aluminum halide-hydrogen halide system. Further, the catalyst of the instant invention is more efficient than the previously employed complex system in that it does not require the presence of an olefin and thus eliminates the possible alkylation of the dicyclic naphthenes. This alkylation reaction tends to act in competition with the isomerization, and inherently decreases the amount of final product obtained.

As a further embodiment of my invention, it has been found that my catalyst is particularly effective in isomerizing dicyclic naphthenes having 12 carbon atoms to an equilibrium mixture of dimethyldecahydronaphthalene which is relatively rich in 2,6-dimethyldecahydronaphthalene. The 2-6 isomer can subsequently be separated, particularly by fractional crystallization, dehydrogenated, and then oxidized to produce the 2,6-dicarboxylic acid. This acid is a highly desirable commercial product, which in previous years has been difficult to produce due to a limited source of the 2,6-dimethylnaphthalene isomer.

The hydrocarbon charge for the instant invention can by any uncondensed dicyclic naphthene having 13–20 carbon atoms and two cyclohexyl rings, or any $C_{12}$ dicyclic naphthene regardless of its precise structure wherein the naphthene rings of said $C_{12}$ compounds can be either condensed or noncondensed, and any alkyl substituent or substituents can be included that will result in the naphthene having 12 carbon atoms. The following are examples of suitable starting dicyclic naphthenes: dimethyldecahydronaphthalenes, ethyldecahydronaphthalenes, trimethylhydrindanes, ethylmethylhydrindanes, dimethylbicyclopentyls, 1,2-bicyclopentylethane, dicyclohexyl, dicyclohexylmethane, dimethyl dicyclohexyls, 3′,3-diethyl dicyclohexylmethane, etc.

According to the invention, one or more dicyclic naphthenes as described above are reacted in the presence of a catalyst system comprising HF or $HSO_3F$ and $SbF_5$ at a temperature in the range of −10° C. to 70° C., preferably at 0–20° C. The lower temperatures are preferred, because the possibility of side reactions is enhanced at the high temperatures. Rearrangement of the starting naphthene rapidly occurs, and decahydronaphthalene having the same number of carbon atoms as the dicyclic naphthene charged are formed in high yield. A small amount of by-products, such as monomethyldecahydronaphthalene, and unidentified $C_{12}$ compounds which may be precursors to the decahydronaphthalene formation are generally formed. An equilibrium product can be obtained by allowing a reaction time of about 1–5 hours, however, the reaction does proceed immediately and a nonequilibrium product can be obtained in 5–20 minutes. It should be noted, however, that the procurement of the equilibrium product is not merely dependent upon the reaction time. For example, if the reaction is run at 25° C., an equilibrium product can be obtained in approximately 30 minutes. The ratio of HF or $HSO_3F$ to charge is operable in the range of 1:1 to 100:1, and preferably a ratio of 10:1 to 20:1 is employed. The ratio of $SbF_5$ to charge is operable in the range 0.1:1 to 5:1, but preferably 0.1:1 to 1:1.

In order that those skilled in the art may more fully comprehend the nature of my invention and its mode of operation, I present the following example.

EXAMPLE 1

The catalyst was prepared by mixing 0.97 mole of HF with 0.015 mole of $SbF_5$. Approximately 23.2 grams of the catalyst and 8.3 grams of dicyclohexyl were added to a rocker bomb and the mixture was shaken at a temperature of about 10° C. for 120 minutes. The hydrocarbon phase was then separated from the catalyst layer, washed first with a carbonate solution and then with water, and subsequently analyzed by vapor phase chromatography. The composition of the product in weight percent is shown in Table 1. It should be noted that comparable results are obtained when catalyzing with $HSO_3F$.

TABLE 1

| | Composition wt. percent |
|---|---|
| Dimethyl decahydronaphthalene | 83.8 |
| Ethyl decahydronaphthalene | 8.7 |
| Unknown A | 5.2 |
| Other | 2.3 |

When the hydrocarbon charge is a $C_{12}$ dicyclic naphthene, such as dicyclohexyl in Example 1, the 2,6-dimethyldecahydronaphthalenes formed can be selectively crystallized, and subsequently dehydrogenated to form 2,6-dimethylnaphthalene employing the method as described by Schneider in U.S. Patent No. 3,243,469. As aforementioned, this 2,6-dimethylnaphthalene can be converted easily to the highly desirable dicarboxylic acid.

As stated previously, various dicyclic naphthalenes can be employed in this invention. The following are examples of said naphthenes and the products obtained therefrom:

Dicyclohexyl methane → trimethyl decahydronaphthalenes
Dimethyl dicyclohexyls → tetramethyl decahydronaphthalenes
Dicyclohexyl ethanes → tetramethyl decahydronaphthalenes
Dicyclohexyl butanes → hexamethyl decahydronaphthalenes Dicyclohexyl hexanes → octamethyl decahydronaphthalenes 3,3'-diethyl dicyclohexyl methane → heptamethyl decahydronaphthalenes

I claim:
1. A method for preparing decahydronaphthalenes which comprises reacting a dicyclic naphthene selected from the group consisting of dicyclic naphthenes having 12 carbon atoms, and uncondensed dicyclic naphthenes having 13–20 carbon atoms and 2 cyclohexyl rings, at a temperature in the range of −10° C. to 70° C. in the presence of a catalyst of $SbF_5$ and a co-catalyst selected from the group consisting of HF and $HSO_3F$ and recovering from the reaction mixture Decalins having the same number of carbon atoms as said dicyclic naphthene.

2. A method according to claim 1 wherein the co-catalyst is HF.

3. A method according to claim 1, wherein the temperature is in the range of 0–20° C.

4. A method according to claim 1, wherein the dicyclic naphthene is dicyclohexyl.

5. A method according to claim 1 wherein the catalyst is present in the ratio of 1:1 to 100:1 $SbF_5$ to dicyclic naphthene and 0.1:1 to 5:1 co-catalyst to dicyclic naphthene.

References Cited
UNITED STATES PATENTS

| | | | |
|---|---|---|---|
| 2,416,966 | 3/1947 | Thomas et al. | 260—666 |
| 3,219,718 | 11/1965 | Schneider | 260—668 |
| 3,243,469 | 3/1966 | Schneider | 260—668 |
| 3,219,719 | 11/1965 | Schneider | 260—668 |
| 3,256,353 | 6/1966 | Shuman | 260—668 |
| 3,346,656 | 10/1967 | Schneider | 260—668 |

OTHER REFERENCES

R. J. Gillespie et al., J. Chem. Soc. (A), 1966, pp. 1170–5.

W. E. Tolberg et al., Inorg. Nucl. Chem. Letter 2 (3) 79–82, 1966.

M. Kilpatrick et al., J. Amer. Chem. Soc. 78, pp. 5186–5189, 1956.

DELBERT E. GANTZ, *Primary Examiner.*

V. O'KEEFE, *Assistant Examiner.*